US005637383A

United States Patent [19]

Sakurai et al.

[11] Patent Number: 5,637,383

[45] Date of Patent: Jun. 10, 1997

[54] ELECTROPHOTOGRAPHIC TRANSFER PAPER

[75] Inventors: Kunio Sakurai; Tsukasa Matsuda, both of Ebina; Masaru Kato; Harumi Watanabe, both of Tokyo, all of Japan

[73] Assignee: Fuji Xerox Co., Ltd., Tokyo, Japan

[21] Appl. No.: 573,148

[22] Filed: Dec. 15, 1995

[30] Foreign Application Priority Data

Dec. 20, 1994 [JP] Japan .................................... 6-316228

[51] Int. Cl.[6] ........................................................ B32B 3/00

[52] U.S. Cl. .......................... 428/211; 428/219; 428/409; 428/511; 428/537.5; 162/138

[58] Field of Search .................................... 428/211, 219, 428/511, 537.1, 409, 537.5; 162/138

[56] References Cited

U.S. PATENT DOCUMENTS 4,778,711 10/1988 Hosomura et al. ...................... 428/211

FOREIGN PATENT DOCUMENTS

| | | |
|---|---|---|
| 62-198877 | 9/1987 | Japan . |
| 3-186855 | 8/1991 | Japan . |
| 3-242654 | 10/1991 | Japan . |
| 5-53363 | 3/1993 | Japan . |
| 5-297621 | 11/1993 | Japan . |
| 5-341553 | 12/1993 | Japan . |
| 5-341554 | 12/1993 | Japan . |
| 6-110243 | 4/1994 | Japan . |
| 6-138688 | 5/1994 | Japan . |
| 6-186769 | 7/1994 | Japan . |
| 6-194860 | 7/1994 | Japan . |

*Primary Examiner*—William Krynski
*Attorney, Agent, or Firm*—Oliff & Berridge

[57] ABSTRACT

Electrophotographic transfer paper of the present invention satisfies at least one of expression of $L_{MD}/H_{MD} \geqq 60$ and $L_{CD}/H_{CD} \geqq 35$, where MD represents a paper direction parallel to the movement direction of a paper machine, $L_{MD}$ (cm) represents stiffness in MD, CD represents a paper direction perpendicular to the movement direction of the paper machine, and $H_{CD}$(%) represents expansivity in CD.

20 Claims, 4 Drawing Sheets

ELECTROPHOTOGRAPHIC TRANSFER PAPER

BACKGROUND OF THE INVENTION

1. Field of the Invention

The present invention relates to duplex printing transfer paper used in indirect dry electrophotographic full-color and monochrome copying machines and printers.

2. Description of the Related Art

In an image forming apparatus such as an electrophotographic copying machine, generally, a transfer method for transferring a toner image onto transfer paper supported on a transfer drum while a transfer material such as transfer paper is being supported on a transfer material holding member such as the transfer drum driven to rotate in synchronism with a toner image carrier such as a photosensitive material drum is mainly used in a color copying machine. In the method, a plurality of toner images can be transferred one over another with good accuracy because the toner images are piled by transferring the toner images successively onto transfer paper supported on the transfer drum.

On the other hand, in a so-called tandem type color copying machine, an endless belt-shaped transfer material holding member is used instead of the aforementioned transfer drum, and a plurality of image forming means corresponding to respective colors are arranged along the movement direction of the transfer material holding member. A color image is formed by transferring respective color toner images successively formed by the respective image forming means onto a transfer material held on the transfer material holding member. The tandem type color copying machine is generally expensive because such a plurality of image forming means are required. However, the copying machine has an advantage in improvement of copying efficiency because a multicolor toner image can be transferred and formed onto a transfer material in a period in which the transfer material is carried by the endless belt-like transfer material holding member.

There is a further method in which a toner image on a photosensitive material is once primarily transferred onto an intermediate transfer material other than paper and then the toner image is secondarily transferred onto paper to obtain a copy image. This method has an effect that failure of multiple transferring and displacement of color registration caused by a lot of factors such as paper holding condition, paper thickness, paper stiffness, and surface property, can be suppressed from occurring in a color copying machine performing multiple transferring.

FIG. 1 is a general structural diagram of a color copying machine using a conventional transfer drum, which comprises an automatic document supply unit 1, an image input portion 2, an image output portion 3, and a paper supply portion 4. Copy cycle in the case of a full color mode will be described below. A color document is set on platen glass 5 by the automatic document supply unit 1. The image input portion 2 includes an imaging unit 6, and a wire 7, a drive pulley 9, and the like for driving the unit. In the case of four colors in full, the image input portion 2 reads the color document by B (blue), G (green) and R (red) as primary colors of light and converts the color document into a digital image signal by using a CCD line sensor and a color filter disposed in the imaging unit 6. Then, the image input portion 2 converts this signal into Y (yellow), C (cyan), M (magenta) and K (black) as primary colors of toner and further converts the color gradation toner signal into an on/off two-valued signal by applying various data processing in order to improve reproducibility in color, gradation, definition, and the like Thus, the image input portion 2 outputs the two-valued signal to the image output portion 3.

The image output portion 3 includes a scanner 10 and a photosensitive material drum 11. Further, there are arranged an electrifier 12 for electrifying the photosensitive material drum 11 uniformly, a developer unit 13 for developing an electrostatic latent image to a toner image, a transfer drum 16 for transferring the toner image onto paper, and a cleaner 15 for recovering the residual toner which has not transferred. The photosensitive material drum 11 is driven by an electric motor so as to rotate in the direction of the arrow shown in the drawing.

In a laser output portion 10*a* of the scanner 10, for example, a yellow image signal from the aforementioned image input portion 2 is converted into a light signal so that a latent image corresponding to the document image is formed on the photosensitive material drum 11 through a polygon mirror 10*b*, an f/θ lens 10*c* and a reflection lens 10*d*. If this yellow latent image is transferred onto paper through development, the residual toner is removed from the photosensitive material drum 11 by the cleaner 15 and then the photosensitive material drum 11 is electrified by the electrifier 12 so that the laser output portion 10*a* outputs a cyan image signal. Thereafter, latent images of magenta and black image signals are formed successively.

The developer unit 13 has a yellow developer 13Y, a cyan developer 13C, a magenta developer 13M, and a black developer 13K. The respective developers are arranged around a rotary shaft. When, for example, a yellow toner image is to be formed, development is performed by the yellow developer 13Y in the position shown in the drawing. When, for example, a cyan toner image is to be formed, the development unit is rotated so that the cyan developer 13C is arranged in a position where the cyan developer 13C touches the photosensitive material drum 11. Magenta and black developments are carried out in the same manner as described above.

A dielectric film or a mesh screen is put up in the outer periphery of the transfer drum 16. The transfer drum 16 is connected to an exclusive-use electric motor or the photosensitive drum 11 by a gear so that the transfer drum 16 is driven to rotate in the direction of the arrow shown in the drawing. A transfer electrifier 17, a separation electrifier 19, a peel claw 20, a destaticizer 21, a cleaner 22, a push roll 23 and an adsorption electrifier 25 are arranged in the periphery of the transfer drum 16. Paper carried from the paper supply portion 4 via paper supply rollers 26 and paper supply guides 27 is held on the dielectric film or mesh screen by corona of the adsorption electrifier 25. The transfer drum 16 rotates in synchronism with the photosensitive material drum 11, so that, for example, a toner image developed by yellow is transferred onto the paper by the transfer electrifier 17 and other colors are transferred successively by the rotation of the transfer drum 16.

When transfer of four colors is completed by four turns of the transfer drum, the transfer drum 16 is AC-destaticized by the separation electrifier 19 provided on the transfer drum 16, so that the paper is separated by the peel claw 20 and fed to a fixer 30 by a carrying belt 29. The toner image is melted and fixed by hot-press rollers 31. Thus, a-copying cycle is completed.

As shown in FIG. 2, the transfer drum 16 is constituted by a body 16*e* and a transfer film 16*a* fixed to the body 16*e* so that the transfer drum 16 is shaped like a hollow cylinder. In the body 16e, cylindrical members 16b and 16c are united at opposite sides with a tie-bar 16d connecting these cylindrical members 16b and 16c, for example, by alminium die casting.

If conventional electrophotographic transfer paper is used particularly in a copying machine or printer of an indirect dry electrophotographic method using such a transfer drum selected from the aforementioned transfer methods, toner is not transferred in the peripheral portion of the second surface particularly in the case where a full-color image is formed on the whole surface of the transfer paper in the same manner as described above at a relatively high humidity and then a whole-surface full-color or monochrome image is formed again on a surface opposite to the image forming surface, that is, in the case where duplex copying is performed. As a result, the image is missing. There arises a problem that partial deletion occurs so as to form white partial deletion portions shaped like semicircles, fingers, and the like as shown in FIG. 3. Further, besides the aforementioned full-color transfer method, the same problem arises in a method for transferring multicolor toners collectively onto transfer paper.

The aforementioned partial deletion is a phenomenon which is newly recognized because there has become frequent the case where a document having an image on its whole surface as often seen in a photographic document, and the like is copied onto opposite surfaces of conventional electrophotographic transfer paper by a conventional color copying machine. Therefore, the phenomenon was not recognized when a document having a low-density image without any image in its peripheral portion as often seen in a character document, and the like had been copied onto opposite surfaces of conventional electrophotographic transfer paper by a monochrome copying machine.

In duplex copying, after a high density image such as a whole-surface full-color image is formed on the first surface of conventional electrophotographic transfer paper, this image formed surface is held so as to contact with a transfer material holding member such as a transfer drum or an endless belt-like transfer material holding member. At this time, as shown in FIGS. 4 and 5, a gap exists because the peripheral portion of transfer paper is not perfectly brought into contact with the transfer material holding member. Consequently, when an image on the second surface exists in the whole surface whether full-color or monochrome, the partial deletion phenomenon occurs in the peripheral portion of the second surface in duplex copying. Here, even in the case of a low-density image, partial deletion is recognized so long as the image on the second surface exists in the whole surface. Of course, when the aforementioned image on the second surface does not exist in the whole surface, for example, in the case of a character image, or the like, having blanks in the peripheral portion, partial deletion does not occur. Exactly, because there is originally no image in the peripheral portion of the second surface of transfer paper, there is no toner image transferred thereto, that is, the peripheral portion is left as a blank space, so that partial deletion cannot be recognized.

It is confirmed that the aforementioned gap is caused by the fact that the surface wariness of transfer paper or the curling of transfer paper toward the image side increases particularly when a full-color image is formed on the whole surface of the first surface of transfer paper in duplex copying. The curling toward the image side is caused by the effect that the contracting force of the toner layer overcomes the bending stiffness of transfer paper, that is, bimetal effect. Accordingly, a full-color image formed from four color toner layers of black, yellow, magenta and cyan has a thicker toner layer than a black-white or monochrome image formed from only one monochrome toner layer, that is, the contracting force of the toner layer increases so that the curling becomes large.

Further, it is confirmed that the aforementioned gap is formed easily when the axis of the curling is formed in the direction of feeding of transfer paper on the basis of balance among fiber orientation aspect ratio, stiffness in MD (Machine Direction, wherein the paper direction is parallel to the direction of movement of the paper), stiffness in CD (Cross Direction, wherein the paper direction is perpendicular to the direction of movement of the paper machine), the quantity of contraction of the toner layer, and the like, because particularly in the case where the transfer material holding member is a transfer drum, the curling is turned to a direction which is not along the curvature of the transfer drum as shown in FIG. 6. Contrariwise, it is confirmed that the aforementioned gap is not formed when the axis of the curling is formed in a direction perpendicular to the direction of feeding of transfer paper, because particularly in the case where the transfer material holding member is a transfer drum, the curling is turned to a direction which is along the curvature of the transfer drum as shown in FIG. 7.

Further, it is confirmed that a gap is formed in the peripheral portion of transfer paper regardless of the kind of the transfer material holding member when the aforementioned surface wariness is increased because of the contraction of fiber caused by dehumidification of transfer paper at the time of hot-press fixing, and the expansion of fiber caused by humidification of transfer paper after the hot-press fixing correspondingly to the fiber orientation ratio of transfer paper, the characteristic of pulp, and the like. It is confirmed that the gap is formed more easily when the condition of higher humidity is given as the environment in which the surface waviness is increased because of humidification/dehumidification of transfer paper.

Incidentally, when the deformation of transfer paper is relatively small though transfer paper is electrostatically held from its front end by the transfer material holding member with respect to the direction of feeding of transfer paper, the deformation can be escaped on the way of this holding. Accordingly, the aforementioned gap is not formed and partial deletion does not occur. When the deformation of transfer paper is contrariwise very large particularly in its rear end, the deformation cannot be escaped on the way of the holding. Accordingly, the aforementioned gap is formed and it is confirmed that partial deletion occurs easily particularly in the rear end portion of the second surface of transfer paper.

It is apparent from the aforementioned partial deletion phenomenon that the partial deletion used herein is a kind of transfer failure which occurs because the transfer condition is changed by a gap formed between the transfer paper and the transfer material holding member on the basis of the physical deformation of transfer paper due to the surface wariness or curling at the time of duplex copying. Transfer failure known conventionally is, however, clearly different from partial deletion at the time of duplex copying, because the conventionally known transfer failure is a transfer failure at the time of simplex copying in a phenomenon that a transfer image having density lowered as a whole is formed or a transfer image is spotted because of scattering of toner under the environment of high humidity or low humidity.

In most cases, the transfer failure in conventional electrophotographic transfer paper occurs because the resistivity of the transfer paper under the environment of high humidity or low humidity is out of proper range for transfer. To improve such transfer failures, there are proposals in which a specific material is used for controlling the resistivity of transfer paper to be in a certain proper range. For example, proposals for plain paper type transfer paper are made in Unexamined Japanese Patent Publication (kokai) Nos. Hei-3-186855 and Hei-5-53363.

Proposals for coating paper type transfer paper are made in Unexamined Japanese Patent Publication Nos. Sho-62-198877 and Hei-3-242654. Further, a proposal for conventional coating type transfer paper is made in Unexamined Japanese Patent Publication No. Hei-5-297621 in which transfer failure caused by discharge irregularity is improved by controlling the diameter of a gap in the original paper layer to be in a proper range.

Conventionally, there are proposals for controlling the curl of electrophotographic transfer paper (Unexamined Japanese Patent Publication Nos. Hei-6-110243, Hei-6-138688 and Hei-6-194860) in which the curl or distortion after hot-press fixing is reduced in order to improve runnability and tray storing characteristic in a monochrome copying machine. They depend on means of setting the separation freeness difference between the front and rear layers of transfer paper to be not larger than a predetermined value, means of setting the fiber orientation index difference between the front and rear layers to be in a predetermined range, means of setting the angle of fiber orientation with respect to MD to be not larger than 10 degrees, and the like. These means do not form means of controlling the curl particularly after hot-press fixing of a full-color image in which four color toner layers are formed. There is much less consideration upon the problem of partial deletion at the time of duplex full-color copying and upon means of controlling the curl or surface wariness of transfer paper as means for improving the problem.

There is a further proposal for controlling the curl (Unexamined Japanese Patent Publication No. Hei-5-341554) in which the curl after hot-press fixing, the curl at the time of humidification and the curl difference between the front and rear surfaces are reduced in order to improve the storage capacity of a sorter or tray, the paper choking therein, and the like, taking into account duplex copying in a monochrome copying machine. The proposal depends on means of setting the CD contracting percentage of transfer paper to be not larger than 0.45% and setting the contracting percentage difference between the front and rear surfaces to be in a range of ±0.02%. There is no consideration upon the problem of partial deletion at the time of full-color duplex copying and upon means of controlling the curl or surface waviness of transfer paper as means for improving the problem.

Conventionally, there is a further proposal for controlling the curl of a full-color image on electrophotographic transfer paper (Unexamined Japanese Patent Publication No. Hei-5-341553) in which the curl after hot-press fixing is reduced by setting the CD moisture expansivity to be not larger than 0.45% and satisfying the relation $Et^3 \geqq 0.26$, where E represents elastic modules in CD tension, and t represents paper thickness. There is, however, no consideration upon the aforementioned problem of partial deletion at the time of duplex copying, so that the proposal is insufficient to provide means of controlling the curl or surface wariness of transfer paper as means for improving the problem. Further, if the CD of transfer paper is a feeding direction perpendicular to the direction of feeding of paper, the problem of partial deletion at the time of duplex copying arises when $Et^3$ is in a range of from about 0.26 to about 0.33 even in the case where the CD moisture expansivity is not larger than 0.45%. Further, even in the case where the CD moisture expansivity and $Et^a$ are controlled simply, the problem of partial deletion at the time of duplex copying may arise correspondingly to the relation between the MD moisture expansivity and $Et^3$ at that time when the MD of transfer paper is a feeding direction perpendicular to the direction of feeding of paper.

There is a further proposal for duplex recordable full-color electrophotographic transfer paper (Japanese Patent Unexamined Publication No. Hei-6-18669) in which non-showthrough is improved by a generally known method in which titanium dioxide, or the like, is used as a filler or pigment in order to set brightness and opacity to be not lower than predetermined values respectively. There is, however, no consideration upon the problem of partial deletion at the time of full-color duplex copying and upon means of controlling the curl or surface wariness of transfer paper as means for improving the problem.

SUMMARY OF THE INVENTION

It is an object of the present invention to provide duplex recordable full-color electrophotographic transfer paper capable of overcoming defects of conventional electrophotographic transfer paper, in Which a higher image quality without partial deletion can be obtained on the second surface at the time of duplex transferring when the paper is used in indirect dry electrophotographic full-color copying machines and printers which are capable of performing duplex output.

In electrophotographic transfer paper of the present invention, stiffness $L_{MD}$(cm) in MD and expansivity $H_{MD}$ (%) in MD satisfy an expression of $L_{MD}/H_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

Further in the electrophotographic transfer paper, wherein stiffness $L_{CD}$(cm) in CD and expansivity $H_{CD}$(%) in CD satisfy an expression of $L_{CD}/H_{CD} \geqq 35$, where CD represents a paper direction perpendicular to the direction of movement of said paper machine, and $L_{CD}$ represent overhanging lengths (cm) when stiffness in MD is calculated by Clark A method in accordance with JISP8143.

The "expansivity of transfer paper" in the present invention means the change percentage of size in the case where the cycle of changing the humidity to 65%RH→25%RH→65%RH→90%RH successively is repeated by three times as a humidification/dehumidification process at 20° C. and finally the humidity is changed to 65%RH→25%RH.

Accordingly, the present invention provides electrophotographic transfer paper which is duplex printing transfer paper used in indirect dry electrophotographic full-color and monochrome copying machines and printers, and in which higher image qualities are obtained on both surfaces without partial deletion.

BRIEF DESCRIPTION OF THE DRAWINGS

In the accompanying drawings.

DETAILED DESCRIPTION OF THE INVENTION

The detailed description of the present invention will be described referring to the accompanying drawings as follows.

In order to solve the conventional problems, the inventors of the present invention have eagerly discussed causes of partial deletion on the second surface at the time of duplex copying particularly in a full-color indirect dry electrophotographic recording system. As a result, it has been found that partial deletion occurs in conventional transfer paper because the curling of transfer paper toward the image side of the first surface or the surface wariness of the peripheral portion of transfer paper after hot-press fixing is large. Consequently, a gap is formed between a transfer material holding member and the transfer paper at the time of transferring onto the second surface. Accordingly, electric field sufficient to transfer is not obtained in the portion thereof, thereby making transfer of toner impossible.

It has been further found that the curl toward the image side or the surface waviness is little present independently and that the curl and the surface waviness are in most cases coexistent practically.

Figure 1:
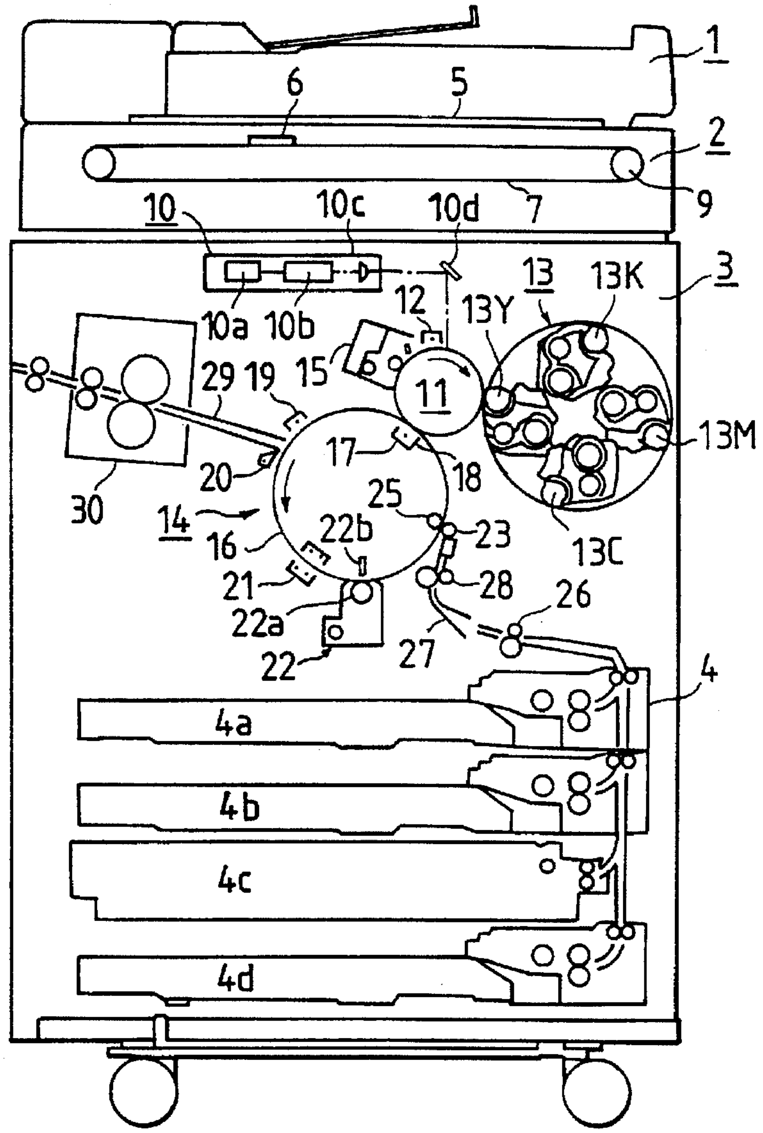
FIG. 1 is an overall structural view of a conventional transfer drum type color electrophotographic copying machine.
Figure 2:
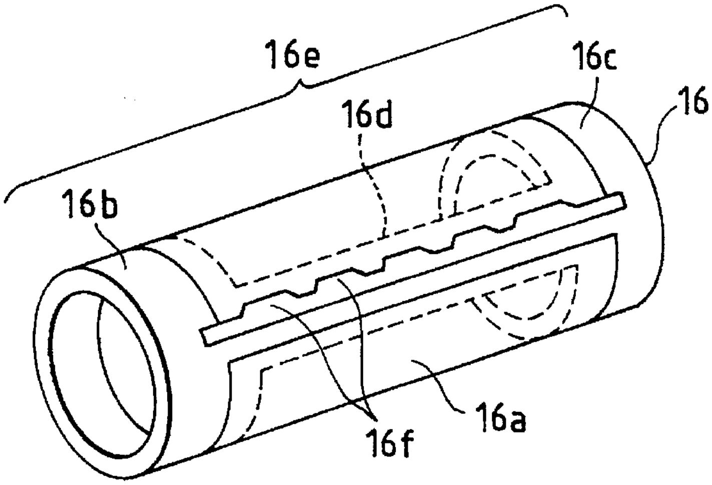
FIG. 2 is a perspective view of the transfer drum depicted in FIG. 1.
Figure 3:
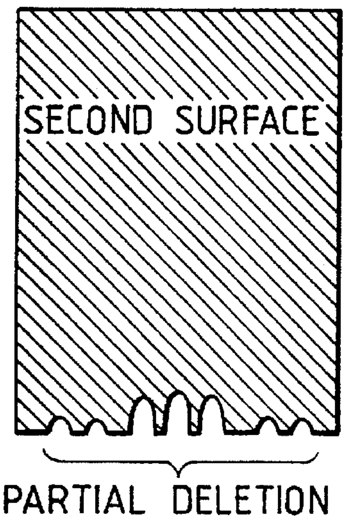
FIG. 3 is an explanatory view showing an example of a pattern of occurrence of partial deletion.
Figure 4:
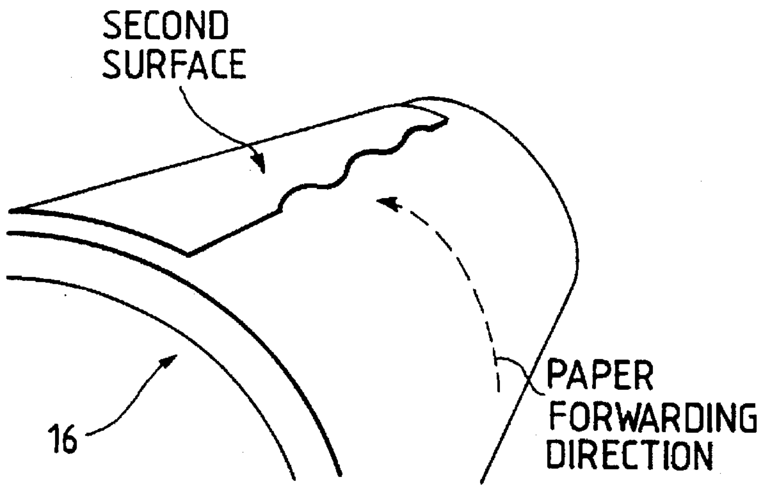
FIG. 4 is an explanatory view showing an example of state of holding transfer paper on the transfer drum at the time of generation of partial deletion.
Figure 5:
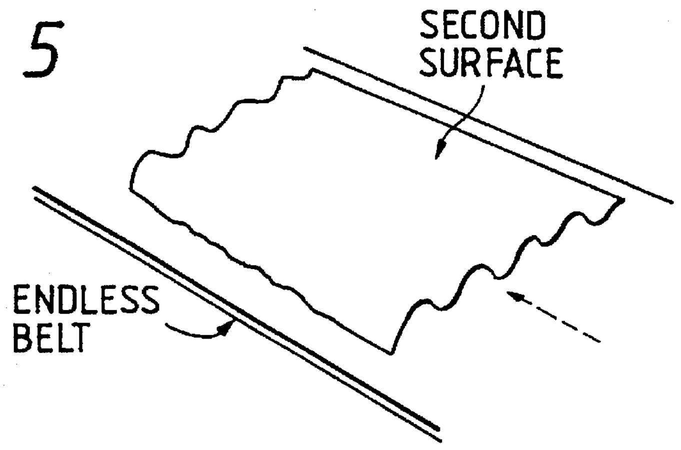
FIG. 5 is an explanatory view showing an example of a state of holding transfer paper on an endless belt at the time of generation of partial deletion.
Figure 6:
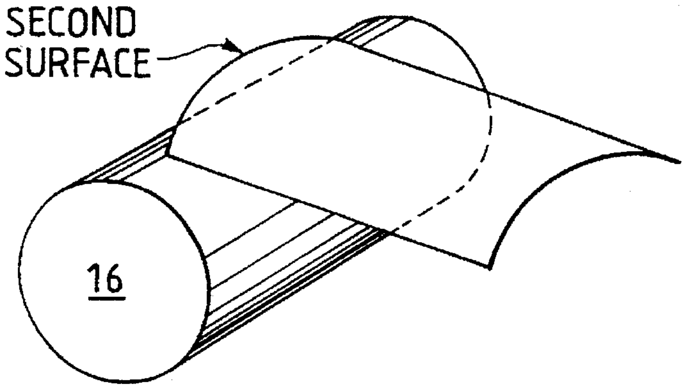
FIG. 6 is an explanatory view showing an example of the curling shape of transfer paper when partial deletion is generated in the transfer drum method.
Figure 7:
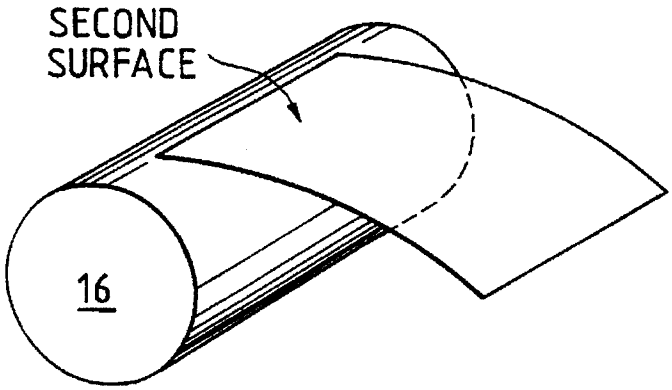
FIG. 7 is an explanatory view showing an example of the curling shape of transfer paper when partial deletion is not generated in the transfer drum method.
Figure 8:
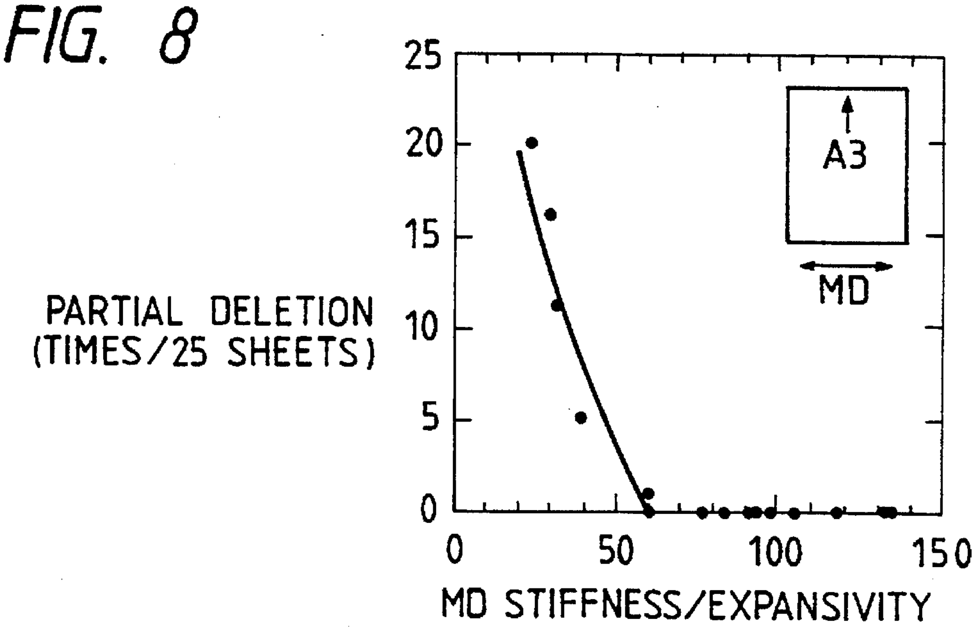
FIG. 8 is a graph showing the relation between [stiffness/expansivity in a paper direction (MD) parallel to the direction of movement of a paper machine] and partial deletion.
Figure 9:
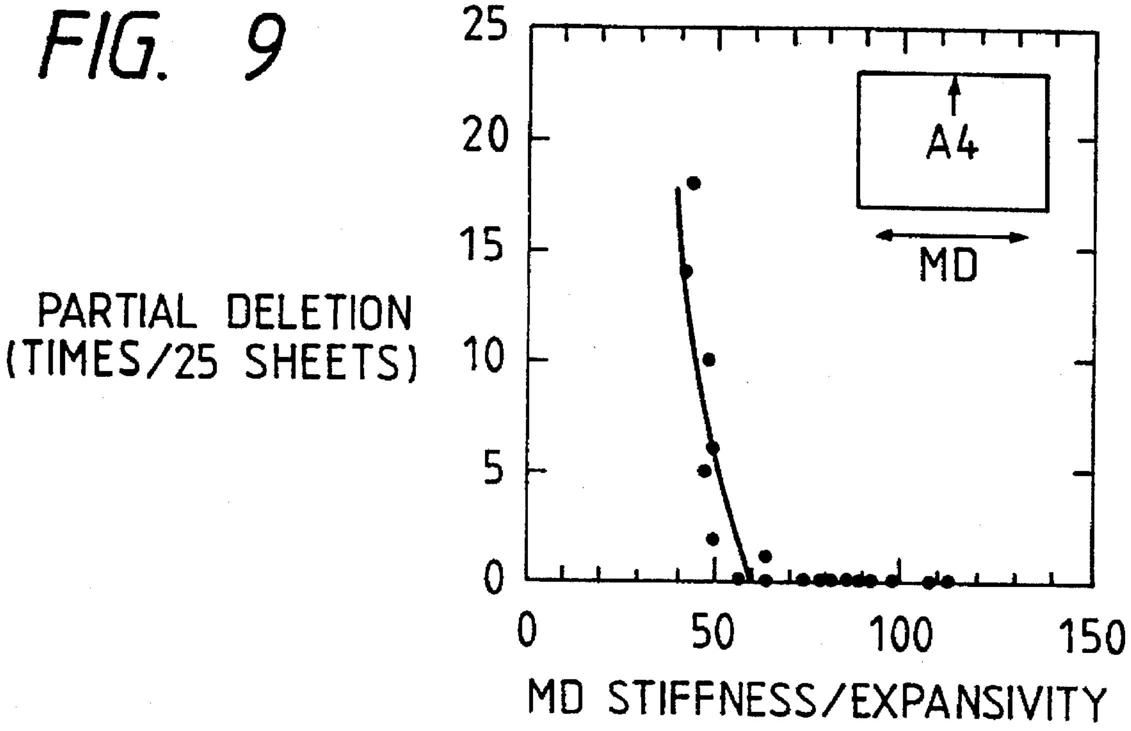
FIG. 9 is a graph showing the relation between [stiffness/expansivity in a paper direction (MD) parallel to the direction of movement of the paper machine] and partial deletion.
Figure 10:
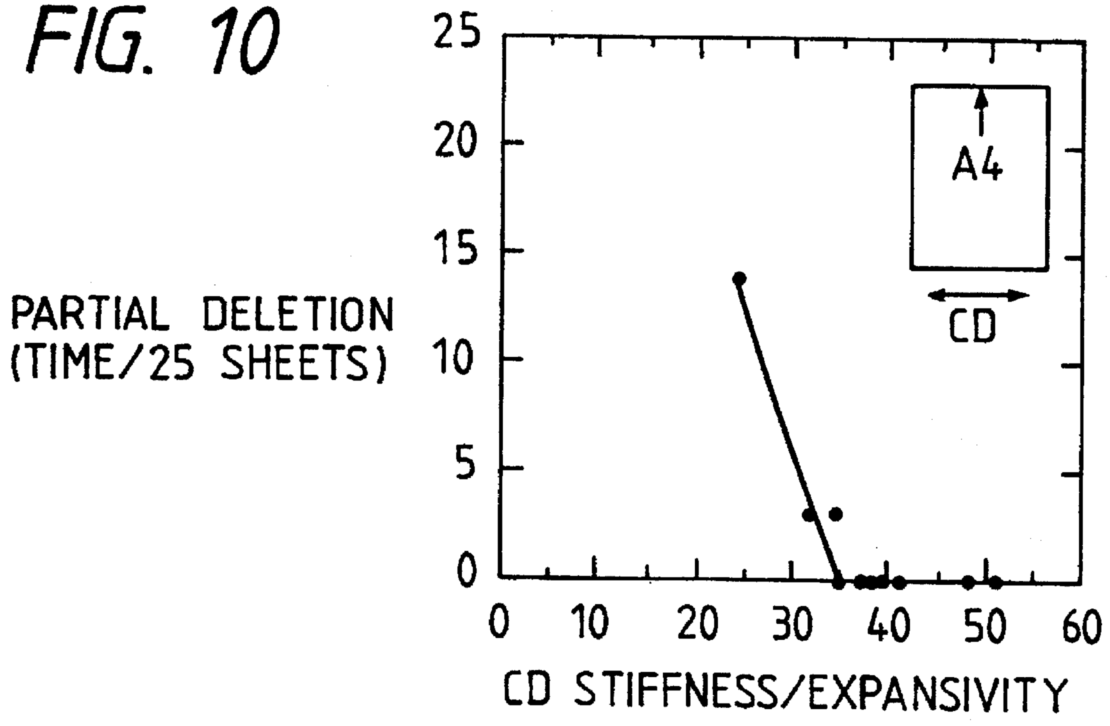
FIG. 10 is a graph showing the relation between [stiffness/expansivity in a paper direction (CD) perpendicular to the direction of movement of the paper machine] and partial deletion.

Therefore, the inventors of the present invention have eagerly discussed control of both the curl of transfer paper toward the image side of the first surface and the surface waviness of transfer paper after hot-press fixing to thereby improve the conventional problem of partial deletion. As a result, it has been found that, surprisingly, partial deletion is improved remarkably as shown in FIGS. 8, 9 and 10 when a value obtained by dividing MD (Machine direction) stiffness (cm) in accordance with JISP8143 by MD expansivity (%) is not smaller than 60 (cm/%) and a value obtained by dividing CD (Cross direction) stiffness by CD expansivity is not smaller than 35 (cm/%).

Specifically, these features are expressed by the following equations:

$$L_{MD}/H_{MD} \geqq 60; \text{ and } L_{CD}/H_{CD} \geqq 35;$$

in which MD represents a paper direction parallel to the direction of movement of a paper machine, CD represents a paper direction perpendicular to the direction of movement of the paper machine, and $L_{MD}$ and $L_{CD}$ represent overhanging lengths (cm) when stiffness in MD and stiffness in CD are calculated by Clark A method in accordance with JISP8143.

In order to reduce the curl toward the image side, it is generally known that the curl can be reduced when the basis weight of transfer paper is increased to make MD stiffness and CD stiffness large to thereby make the bending stiffness of transfer paper overcome the contracting force of the toner layer. If the basis weight is not smaller than 120 g/m$^2$ in the case where the transfer material holding member is a transfer drum, stiffness, however, becomes so large, that is, the bending stiffness becomes so large that there arises a secondary failure that transfer paper is not adsorbed onto the transfer drum.

Further, in a low-temperature environment, the temperature of transfer paper becomes low, but when the basis weight of transfer paper is not smaller than 110 g/m$^2$, the thermal capacity of paper becomes large, so that toner cannot be melted and fixed sufficiently, that is, so-called cold-offset occurs.

From such reasons, it is necessary to increase stiffness or reduce expansivity so that the basis weight of transfer paper is not larger than 110 g/m$^2$ The inventors of the present invention have found that expansivity can be reduced in the condition of the basis weight of transfer paper of not larger than 110 g/m$^2$ by providing 30% by weight or more of dry pulp per total pulp weight as pulp used in transfer paper. Because dry pulp has cornified fibers, the expansivity of paper is reduced. As a result, stiffness/expansivity ratio satisfying the aforementioned expressions (1) and (2) can be obtained so that the binding area between fibers is reduced. Accordingly, scatter coefficient becomes large, so that opacity can be increased. Here, dry pulp is defined as follows.

Pulp is generally produced by digesting and bleaching a cellulose-containing material such as wood, bagasse, rice straw, and the like Pulp smashed while kept in the form of slurry or gruel after bleaching to be used in a paper-making process is called wet pulp or slash pulp.

On the contrary, pulp bleached, dried so as to be once shaped like a sheet, separated by water in advance for paper-making so as to be shaped like slurry and then smashed to be used is called dry pulp.

In order to reduce the surface waviness, it is necessary to reduce the expansivity of transfer paper. Because CD expansivity is however generally considerably larger than MD expansivity, there arises a problem that CD expansivity is particularly larger with respect to the surface wariness. This is because the lengthwise directions of fibers and the widthwise directions of fibers are apt to be aligned in MD and in CD respectively and, furthermore, the widthwise expanding ratio of fibers becomes larger than 30 times the lengthwise expanding ratio of fibers when fibers constituting transfer paper are successively humidified. It is thought that the reason why the lengthwise change of size is small when fibers are successively humidified in this manner is that chains of cellulose molecules are aligned in the lengthwise direction and, on the contrary, the reason why the widthwise change of size is large in the same case is that a great deal of surfaces of crystals of cellulose molecules or a great deal of distances between the crystals are contained, so that water molecules enter the portions thereof to increase the width.

Conventionally, the fiber orientation ratio is reduced, that is, the lengthwise directions of fibers aligned in MD is randomized to turn the lengthwise directions to CD to thereby reduce CD expansivity. In this case, it is a matter of course that MD expansivity becomes large but is smaller than CD expansivity. If the fiber orientation ratio is, however, set lower than 1.10 so as to be very near 1, it is undesirable from the viewpoint of runnability and storage characteristic that torsion and curling becomes large.

If the fiber orientation ratio is larger than 1.25, the curl with MD as the axis becomes large because of the difference between the change of MD size and the change of CD size. Accordingly, particularly in the case where the transfer material holding member is a transfer drum, partial deletion occurs because the curl is turned to a direction which is not along the curvature of the transfer drum when the direction of feeding of transfer paper is MD.

In order to improve partial deletion at the time of duplex copying, it has been confirmed from the above description that it is necessary to reduce the curl or wariness of the axis of the feeding direction toward the image side regardless of the feeding direction, whether it is longitudinal feeding or transverse feeding of transfer paper, and regardless of the paper direction, whether the lengthwise direction of transfer paper at that time is MD (longitudinal direction) or CD (transverse direction), and that it is necessary to control the MD stiffness, CD stiffness, MD expansivity, CD expansivity and fiber orientation ratio of transfer paper to have relations of the present invention.

Further, because the subject of the present invention is duplex transfer paper, it is preferable to prevent showthrough due to the image formed on the first surface when the paper is seen from the second surface. Therefore, the quantity of adduct filler in base paper and the quantity of duplex coating are adjusted so that opacity (JIS P 8138) is set to be not lower than 90%.

Further, in the present invention, preferably, the surface resistivity (JISK6911) of transfer paper at 20° C. and 65% RH is set to be in a range of $1\times10^9$ to $1\times10^{11}\Omega$ and the density of the base paper of transfer paper is set to be in a range of 0.80 to 0.90 g/cm$^3$ in order to prevent image disorder in an electrophotographic system to maintain suitable copy image density. This is because toner transfer becomes insufficient under a high-humidity environment if the surface resistivity is lower than $1\times10^9\Omega$, and toner scatter occurs at the time of toner transfer under a low-humidity environment if the surface resistivity is higher than $1\times10^{11}\Omega$, image quality is reduced in the respective cases. If the density of the base paper is lower than 0.80, the surface smoothness becomes insufficient, so that image quality is lowered even if a pigment layer is provided. If the density is higher than 0.90, stiffness is reduced, so that there arises a problem of partial deletion and runnability.

Pulp used in the base paper of the electrophotographic transfer paper of the present invention- is not limited specifically. For example, chemical pulp such as LBKP (hardwood bleached kraft pulp), NBKP (needle-leaf bleached kraft pulp), LBSP (hardwood bleached sulfite pulp), NBSP (needle-leaf bleached sulfite pulp), and the like can be used. Incidentally, when softwood pulp such as NBKP, NBSP, and the like is used, fiber is long so that a flock is apt to be generated to cause bad formation. From the point of view of increasing stiffness for controlling the curl after copying, it is preferable that 80% by weight or more of LBKP is mixed in the total pulp. Further, when 30% by weight or more of dry pulp such as LBKP, or the like, is mixed in the total pulp, stiffness can be increased more greatly by the cornification function of pulp. At the same time, the binding area between fibers is reduced so that scatter coefficient becomes large. There arises an effect that opacity is increased.

Further, non-wood pulp such as linter pulp, and the like, and high-yield pulp such as waste paper pulp, GP (ground wood pulp), TMP (thermo-mechanical pulp), and the like can be used mixedly or singly taking into account the degree of deterioration of formation and taking into account color reproducibility so that brightness is not so low after coating.

In order to enhance the brightness after coating, the aforementioned pulp may be selectively used in the base paper, pulp obtained by enforcing the pulp bleaching process may be used, or a fluorescent dye may be mixed in pulp slurry in use.

A filler is used in the base paper according to the present invention in order to increase the density, control the surface smoothness and improve aptitude for coating, and for the purpose of adjustment of opacity and brightness after coating, or the like.

Examples of the filler which can be used herein include: calcium carbonate such as ground lime stone, precipitated calcium carbonate, and chalk; silicates such as kaolin, calcined clay, pyrophyllite, sericite, and talc; inorganic fillers such as titanium dioxide; and organic pigments such as urea resin, and styrene. The filler is not limited thereto. From the point of view of opacity after coating, it is particularly preferable that titanium dioxide of high refractive index, precipitated calcium carbonate, or the like, is used.

Although the quantity of proportion of the filler is not limited specifically, the quantity is preferably in a range of 5% by weight to 20% by weight, more preferably in a range of 7 to 15% by weight. If the quantity of proportion of the filler is smaller than 5% by weight, a high-density process by calendaring or the like is hardly effectuated, the refraction of light is lowered because of the filler so as to lower the opacity, and stiffness of paper becomes so strong that its runnability is lowered. If the quantity of proportion of the filler is larger than 20% by weight, stiffness of paper is contrariwise weakened so that sufficient stiffness which is an object of the present invention cannot be obtained.

Various kinds of chemicals such as sizing agents, or the like, used in the base paper of the present invention can be used by adduction or abduction. Examples of the kinds of sizing agents include sizing agents such as rosin sizing agents, synthetic sizing agents, petroleum resin sizing agents, and neutral sizing agents. Suitable fixing agents for sizing agents such as sulfate band and cationic starch, and fiber can be used in combination. From the point of view of preservation of paper after copying in electrophotographic copying machines and printers, neutral sizing agents, particularly, alkenyl succinic anhydride sizing agents are preferable.

In order to adjust the surface resistivity, inorganic compounds such as sodium chloride, potassium chloride, calcium chloride, sodium sulfate, zinc oxide, titanium dioxide, tin oxide, alminium oxide and magnesium oxide, and organic compounds such as alkyl phosphate, alkyl sulfate, sodium sulfonate, quaternary and ammonium salt can be used singly or mixedly. Besides these, paper force strengthening agents, dyes, pH adjusting agents, and the like may be added.

The method of making the base paper is not limited specifically. For example, there may be used a method in which, in order to improve formation, a screen, a swirl cleaner or the like, is disposed in front of a head box of the paper machine to thereby straighten the fluidity direction of the base paper material, or a method in which flocking of unaffected material is managed by using a dispersing agent, a formation control additive agent and a retention and filtered water assisting agent.

As pigments used in the coating layer of the electrophotographic transfer paper of the present invention, various kinds of pigments ordinarily used in ordinary coating paper can be used singly or in combination. Examples of the pigments include: mineral pigments such as ground lime stone, precipitated calcium carbonate, titanium dioxide, alminium hydroxide, satin white, talc, calcium sulfate, barium sulfate, zinc oxide, magnesium oxide, magnesium carbonate, amorphous silica, colloidal silica, white carbon, kaolin, baked kaolin, delaminated kaolin, aluminosilicate, sericite, bentonite and smectite; organic pigments such as polystyrene resin fine particles, urea formaldehyde resin fine particles, microballoon particles; and the like. The amount of pigments having the form of flat plate-like crystals or the form of laminated flat plate-like crystals is set to be not larger than 70% by weight, preferably not larger than 60% by weight, in all coating pigments.

As adhesive agents used in the coating layer of the present invention, water-soluble adhesive agents, emulsion, latex and the like having strong adhesive force with respect to the base material and additives of pigments and the like, and having little blocking characteristic can be used singly or mixedly. For example, there are used water-soluble resins such as polyvinyl alcohol, denatured polyvinyl alcohol, starches, gelatin, casein, methyl cellulose, hydroxyethyl cellulose, acrylic amide-acrylic ester copolymer, acrylic amide-acrylic acid-methacrylic acid terpolymer, styrene-acryl resin, isobutylene-maleic anhydride resin and carboxymethyl cellulose, acrylic emulsion, vinyl acetate emulsion, vinylidene chloride emulsion, polyester emulsion, styrene-butadiene latex, acrylonitrile-butadiene latex, and the like. The adhesive agent is, however, not limited specifically.

The proportion of the adhesive agent to 100 part by weight of the pigment in the coating composition is in a range of 5 to 230 part by weight, preferably in a range of 7 to 200 part by weight. If the proportion of the adhesive agent is lower than 5 part by weight, coating film strength is weakened undesirably. If the proportion of the adhesive agent is higher than 230 part by weight, voids of the coating layer are filled with the adhesive agent so that image quality deteriorates undesirably because there is no void into which melted toner can penetrate.

Incidentally, besides these, dye for adjusting color tone or color pigment may be added to the coating composition or fluorescent coating may be added to the coating composition in order to improve visual brightness.

Further, as an agent for adjusting the surface resistivity, a known material used in the base material can be used.

Further, various kinds of assisting agents such as dispersing agents, antifoam agents, plasticizers, pH adjusting agents, fluidity denaturing agents, solidification promoting agents, water resisting agents and sizing agents can be added in order to make adjustment of the coating composition easy.

The quantity of coating, in the sense of solid matter quantity per one side surface, of the present invention is not smaller than 2 g/m$^2$, preferably larger than 2.5 g/m$^2$ and not larger than 12 g/m$^2$. If the quantity of coating is smaller than 2 g/m$^2$, the quantity of coating is so small that fibers on the whole area of paper cannot be coated. Accordingly, roughness between fibers is left on the surface of transfer paper, so that an image without any disorder cannot be formed. Further, because the amount of the pigment is small, sufficient opacity can be obtained. If the quantity is larger than 12 g/m$^2$, the image improving effect is saturated so that the feeling of plain paper is spoiled undesirably.

As a coating method, for example, any on-machine coater in which a coating machine is provided for gate roll coating, size-press coating, and the like and any off-machine coater for blade coating, air-knife coating, roll coating, bar coating, reverse roll coating, gravure coating, curtain coating, and the like can be used.

A smoothing process after coating can be carried out by machine calendaring, super calendaring, and the like so that the Oken type smoothness (according to a method described in JAPAN TAPPI No. 5, hereinafter referred to as smoothness, simply) of the transfer layer after coating and drying is set to be in a range of from 20 to 300 sec. Preferably, the smoothness is set to be in a range of 30 to 200 sec. In the case of a low-smooth surface having lower smoothness than 20 sec, good transferring cannot be made. In the case of a high-smooth surface having higher smoothness than 300 sec, voids formed on the coating surface are broken so greatly that there is no void into which melted toner can penetrate. As a result, it is undesirable that image quality deteriorates and that blocking is apt to occur at high humidity.

It is preferable that the basis weight of transfer paper of the present invention is in a range of 80 to 110 g/m$^2$. If the basis weight is larger than 110 g/m$^2$, the thermal capacity of paper is large as described preliminarily, so that toner cannot be melted and fixed sufficiently particularly under a low-temperature environment, that is, so-called cold offset occurs. If the basis weight is smaller than 80 g/m$^2$, stiffness of paper is weakened so that stiffness which is an object of the present invention cannot be obtained. Further, fibers are small in number and thin, so that sufficient opacity cannot be obtained.

Further, the water content of the product just after disclosure is adjusted by the paper machine or by the dryer and calender process of the coater, or the like, so as to be not larger than 6%, preferably in a range of from 3.5 to 5.5% to suppress the occurrence of mottling, to thereby suppress the occurrence of surface waviness and of curling after copying. Further, the product is packed in moisture-proof packing paper such as polyethylene laminate paper, polypropylene and the like so that humidification/dehumidification does not occur when the product is stored.

EXAMPLES

Examples of the present invention will be described below more specifically, however the present invention is not limited thereto.

EXAMPLE 1

As a raw material, there was used 100 part by weight of pulp obtained by beating LBKP multistageously bleached and highly whitened by oxygen, chlorinated lime or the like, up to a freeness of 470 mlC.S.F. Of the raw material, 50 part by weight of dry pulp (solid content: this will be applied to the following description), 0.08 part by weight of alkenyl succinic anhydride (Fibran 81: National Starch & Chemical Co., Ltd.) per pulp and 0.5 part by weight of cationic starch (Cato Size: National Starch & Chemical Co., Ltd.) per pulp were mixed as an adduct while precipitated calcium carbonate (TP121: Okutama-Kogyo Co., Ltd.) was added so as to be 15 part by weight.

A small amount of fluorescent dye was mixed in this paper material so that brightness by Hunter was 85% after producing paper. Jet/Wire ratio and Wire speed were controlled so that a basis weight of 86 g/m$^2$ and fiber orientation ratio of 1.16 were obtained. Paper was made by a Fourdriner multicylinder paper machine. After paper was made, a dryer condition was adjusted so that the water content was 5% by weight. Further, 0.9 $g/m^2$ of oxidized starch and 0.1 $g/m^2$ of NaCl were applied in a size press process. Further, the pressure of a press process and the pressure of a machine calender were strengthened to make smoothness and density high. Thus, base paper having an apparent density of 0.84 $g/cm^3$ was obtained.

Then, 0.5 part by weight of sodium pyrophosphate was added to 100 part by weight of water, and 50 part by weight of precipitated calcium carbonate (Maruo Calcium Co. Ltd.) with a mean size of 2 μm ,and 50 part by weight of kaolin clay (Comalco kaolin made by Comalco Japan Co., Ltd.) were mixed thereto. Then, water was dispersed by a cowless dissolver, so that pigment slurry was obtained. To this pigment slurry, 95 part by weight of starch (Oji Ace A: Oji Corn Starch Co. Ltd.) and 5 part by weight of SBR (JSR0668: Japan Synthetic Rubber Co., Ltd.) were added as a binder. The mixture was mixed with water and stirred, so that a coating composition with a concentration of 15% was prepared.

This coating composition was applied by a Meyer bar coater so that the quantity of coating after drying was 4 $g/m^2$ as a solid matter on the F (felt) surface of the base paper and 4 $g/m^2$ on the W (wire) surface of the base paper and that the total basis weight was 95 $g/m^2$. Then, a super calendering process was carried out so that the Oken type smoothness of the coating surface of the F surface was 100 sec., and adjustment was made so that the water content of the resulting product after disclosure was 4%. Thus, electrophotographic transfer paper of Example 1 having characteristic shown in Table 1 was obtained.

It was apparent from Table 1 that the transfer paper of Example 1 had no partial deletion, was excellent in nonshowthrough and had no density irregularity and no toner scatter and was good in feeling of plain paper.

An indirect dry electrophotographic digital color copying machine A-Color 635 manufactured by Fuji Xerox Co., Ltd. was used for evaluating partial deletion. While a color photograph having an image area ratio of 50% was used as a document, the image of the document was transferred onto 25 sheets of aforementioned transfer paper continuously and fixed. After the document was changed to a whole-surface gray chart of 30% image area ratio, the image of the document was transferred onto the second surfaces of the 25 sheets of transfer paper with respect to which copying on the first surfaces was finished, and fixed in the same manner as described above. Thus, duplexd copies were obtained.

The second surfaces were observed by eyes so that partial deletion was evaluated by the number of times of occurrence per 25 sheets upon the assumption that the number of times of occurrence was increased by one whenever partial deletion was recognized.

With respect to the nonshowthrough, after the character document was copied onto the first surface of transfer paper by the aforementioned copying machine, the transfer paper was observed by eyes from a side opposite to the first surface to evaluate the nonshowthrough on the basis of the following measure.

[Nonshowthrough]

A: good

B: slight but tolerable

C: a little

D: conspicuous

With respect to density irregularity, after 2 cm×2 cm patches of image area ratios 70, 80, 90 and 100% of Black, Yellow, Magenta, Cyan, Red, Green, Blue and mixture Black of Yellow, Magenta and Cyan were transferred onto the aforementioned transfer paper and fixed by the aforementioned copying machine, the transfer paper was observed by eyes to evaluate the density irregularity on the basis of the following measure.

[Density Irregularity]

A: good

B: slight but tolerable

C: a little

D: conspicuous

With respect to toner scatter, after patches of image area ratios 70, 80, 90 and 100% of respective colors were transferred onto the aforementioned transfer paper and fixed, the transfer paper was observed by eyes to evaluate the toner scatter on the basis of the following measure.

[Toner Scatter]

A: good

B: slight but tolerable

C: a little

D: conspicuous

With respect to feeling of plain paper, the aforementioned transfer paper was observed by eyes and by touching to evaluate the feeling of plain paper on the basis of the following measure.

[Feeling of Plain paper]

A: good

B: slightly lack of feeling of plain paper but tolerable

C: bad

D: no feeling of plain paper

The experimental environment used for evaluating partial deletion, nonshowthrough, density irregularity and feeling of plain paper in this occasion was selected to be 22° C. and 55% RH. Further, the experimental environment used for evaluating toner scatter was selected to be 10° C. and 30% RH.

EXAMPLES 2 and 3

The same paper material as in Example 1 was used, and transfer paper of Examples 2 and 3 was obtained in the same manner as in Example 1, except that the Jet/Wire ratio was changed and the fiber orientation ratio was adjusted to 1.24 and 1.10 respectively.

The transfer paper in each of Examples 2 and 3 had no partial deletion, was excellent in nonshowthrough, had no density irregularity and no toner scatter and was good in feeling of plain paper.

EXAMPLE 4

Transfer paper of Examples 4 was obtained by paper-making and coating in the same paper-making condition as in Example 1, except that the amount of dry pulp mixed in the paper material of Example 1 was changed to 35 part by weight.

The transfer paper of Examples 4 had no partial deletion, was excellent in nonshowthrough, had no density irregularity and no toner scatter, and was good in feeling of plain paper.

EXAMPLES 5 and 6

The same paper material as in Example 1 was used, and transfer paper of Examples 5 and 6 having the total basis weights of 82 $g/m^2$ and 110 $g/cm^2$ respectively was obtained by paper-making and coating in the same paper-making condition as in Example 1, except that the basis weight of base paper was selected to be 73 g/m$^2$ and 101 g/m$^2$ respectively.

The transfer paper of Example 5 had no partial deletion, no density irregularity and no toner scatter, was good in feeling of plain paper, and was practically satisfiable in nonshowthrough.

The transfer paper of Example 6 had no partial deletion, was excellent in nonshowthrough, had no density irregularity and no toner scatter and was good in feeling of plain paper.

EXAMPLES 7 and 8

Transfer paper of Example 7 was obtained by using the same paper material and performing paper-making in the same paper-making condition as in Example 1 and by coating in the same manner as in Example 1, except that the amount of NaCl in the size press process was changed from 0.1 g/m$^2$ to 0.05 g/m$^2$.

Further, transfer paper of Example 8 was obtained by coating in the same manner as in Example 7, except that the amount of NaCl in Example 7 was changed to 0.15 g/m$^2$.

The transfer paper of Example 7 had no partial deletion, was excellent in nonshowthrough, had no density irregularity and was practically satisfiable in toner scatter.

The transfer paper of Example 8 had no partial deletion, was excellent in nonshowthrough, has no density irregularity and no toner scatter, and was good in feeling of plain paper.

EXAMPLES 9 and 10

Using the same paper material and condition as in Example 1, a coating composition obtained by adding 0.1 part by weight of NaCl to the same coating composition as in Example 1 was applied as a sizing solution by 2 g/m$^2$ per one surface and 4 g/m$^2$ per both surfaces by a size press process at the time of paper-making to thereby prepare transfer paper of Example 9 having the total basis weight of 90 g/m$^2$.

On the other hand, paper-making was performed by using the same paper material as in Example 1 and in the condition of the basis weight of the base paper of 85 g/m$^2$ to thereby prepare transfer paper of Example 10 in which the amount of coating was 12 g/m$^2$ on a single side (24 g/m$^2$ on both sides) in which the total basis weight is 110 g/m$^2$.

The transfer paper of Example 9 had no partial deletion, was excellent in nonshowthrough, had no toner scatter, was good in the feeling of plain paper and was practically satisfiable in density irregularity.

The transfer paper of Example 10 had no partial deletion, was excellent in nonshowthrough, had no density irregularity and no toner scatter and was practically satisfiable in the feeling of plain paper.

EXAMPLES 11 and 12

Paper-making was performed by using the same paper material as in Example 1 and in the same- condition as in Example 1, and then a machine calender was adjusted to thereby prepare two kinds of base paper with density of 0.80 g/cm$^3$ and density of 0.90 g/cm$^3$ respectively. The two kinds of base paper were subjected to duplex coating in the rate of 4 g/m$^2$ per single side to thereby prepare two kinds of transfer paper of Examples 11 and 12.

Each of the two kinds of transfer paper of Examples 11 and 12 had no partial deletion, was excellent in nonshowthrough, has no density irregularity and no toner scatter and was good in the feeling of plain paper.

EXAMPLE 13

Paper-making was performed by using the same paper material as in Example 1 and in the same condition as in Example 1. As a binder of a coating composition, 15 part by weight of acrylic resin (LX851 made by Nippon Zeon Co., Ltd.) and 5 part by weight of PVA (NL-05 made by Japan Synthetic Rubber Co., Ltd.) were added to 100 part by weight of pigment slurry to thereby adjust the coating composition concentration to 20 part by weight. The coating composition was applied to the F surface by 4 g/m$^2$ and to the W surface by 4 g/m$^2$ to thereby prepare transfer paper of Example 13.

The transfer paper of Examples 13 had no partial deletion, was excellent in nonshowthrough, had no density irregularity and no toner scatter and was good in the feeling of plain paper.

TABLE 1

| Example | 1 | 2 | 3 | 4 | 5 | 6 | 7 | 8 | 9 | 10 | 11 | 12 | 13 |
|---|---|---|---|---|---|---|---|---|---|---|---|---|---|
| BASIS WEIGHT (g/m$^2$) | 86 | 86 | 86 | 86 | 73 | 101 | 86 | 86 | 86 | 85 | 86 | 86 | 86 |
| DENSITY (g/m$^3$) | 0.84 | 0.84 | 0.84 | 0.84 | 0.84 | 0.84 | 0.84 | 0.84 | 0.84 | 0.84 | 0.80 | 0.94 | 0.84 |
| DRY PULP MIXTURE RATIO (WEIGHT %) | 50 | 50 | 50 | 35 | 50 | 50 | 50 | 50 | 50 | 50 | 50 | 50 | 50 |
| TOTAL BASIS WEIGHT (g/m$^2$) | 95 | 95 | 95 | 95 | 82 | 110 | 95 | 95 | 90 | 110 | 95 | 95 | 95 |
| COATING AMOUNT ON FS/WS FACE (g/m$^2$) | 4/4 | 414 | 4/4 | 4/4 | 4/4 | 4/4 | 4/4 | 4/4 | 2/2 | 12/12 | 4.4 | 4/4 | 4/4 |
| OPACITY (%) | 93.8 | 93.6 | 93.6 | 93.1 | 91.5 | 94.5 | 93.8 | 93.8 | 93.2 | 94.8 | 94.2 | 93.0 | 94.2 |
| MD STIFFNESS (cm) | 20.9 | 21.2 | 20.3 | 21.1 | 19.9 | 22.8 | 20.9 | 20.8 | 20.2 | 22.0 | 21.4 | 18.5 | 20.1 |
| CD STIFFNESS (cm) | 19.2 | 18.8 | 19.7 | 19.2 | 18.2 | 19.8 | 19.1 | 19.0 | 18.8 | 19.8 | 19.5 | 16.5 | 18.6 |
| MD EXPANSIVITY (%) | 0.30 | 0.29 | 0.32 | 0.34 | 0.30 | 0.32 | 0.30 | 0.30 | 0.30 | 0.30 | 0.30 | 0.30 | 0.30 |
| CD EXPANSIVITY (%) | 0.43 | 0.46 | 0.42 | 0.50 | 0.42 | 0.44 | 0.43 | 0.43 | 0.43 | 0.43 | 0.43 | 0.43 | 0.42 |
| MD (STIF./EXT.) | 69.7 | 73.1 | 63.4 | 62.1 | 66.3 | 71.3 | 69.7 | 69.3 | 67.3 | 73.3 | 71.3 | 61.7 | 67.0 |

TABLE 1-continued

| Example | 1 | 2 | 3 | 4 | 5 | 6 | 7 | 8 | 9 | 10 | 11 | 12 | 13 |
|---|---|---|---|---|---|---|---|---|---|---|---|---|---|
| CD (STIF./EXT.) | 44.7 | 40.9 | 46.9 | 38.4 | 43.3 | 45.0 | 44.4 | 44.2 | 43.7 | 51.2 | 45.0 | 38.4 | 44.3 |
| FIBER ORIENTATION RATIO | 1.16 | 1.24 | 1.10 | 1.16 | 1.16 | 1.16 | 1.16 | 1.16 | 1.16 | 1.16 | 1.16 | 1.16 | 1.16 |
| SURFACE RESIST. (Ω) | 4.0 × $10^9$ | 4.0 × $10^9$ | 4.0 × $10^9$ | 4.0 × $10^9$ | 4.0 × $10^9$ | 4.0 × $10^9$ | 8.8 × 1010 | 1.6 × $10^9$ | 4.0 × $10^9$ | 4.0 × $10^9$ | 4.0 × $10^9$ | 4.0 × $10^9$ | 4.0 × $10^9$ |
| SHOWTHROUGH (TIMES/25) | 0 | 0 | 0 | 0 | 0 | 0 | 0 | 0 | 0 | 0 | 0 | 0 | 0 |
| TRANSPARENCY TO BACK | A | A | A | A | B | A | A | A | A | A | A | A | A |
| DENSITY IRREGULARITY | A | A | A | A | A | A | A | A | B | A | A | A | A |
| TONER SCATTERING | A | A | A | A | A | A | B | A | A | A | A | A | A |
| FEELING OF ORDINARY | A | A | A | A | A | A | A | A | A | A | A | A | A |

Comparative Examples 1 and 2

Two kinds of transfer paper of Comparative Examples 1 and 2 were prepared in the same manner as in Example 1, except that fiber orientation was adjusted to 1.08 and 1.28 respectively by using the same paper material as in Example 1.

Because the transfer paper of Comparative Example 1 had little fiber orientation, torsion curling occurred after printing on one surface, running character was poor and partial deletion occurred, so that the transfer paper was not suitable for practical use.

Because the transfer paper of Comparative Example 2, contrariwise, had large fiber orientation, curling per se became large after printing on one surface, running character was poor and partial deletion occurred, so that the transfer paper was not suitable for practical use.

Comparative Examples 3 and 4

Transfer paper of Comparative Example 3 was prepared by paper-making and coating in the same paper-making condition as in Example 1, except that the proportion of dry pulp of Example 3 was changed from 50 part by weight to 20 part by weight.

Transfer paper of Comparative Examples 4 was prepared by paper-making and coating in the same condition as in Example 1, except that the amount of adduct in Example 1 was set to be 4% by weight.

In the transfer paper of Comparative Example 3, moisture expansivity increased, curling became large after printing on one surface, runnability was poor and partial deletion occurred, so that the transfer paper was not suitable for practical use.

On the other hand, in the transfer paper of Comparative Examples 4, opacity was low, so that the transfer paper was not suitable for practical use in nonshowthrough as duplex transfer paper.

Comparative Examples 5 and 6

Two kinds of transfer paper of Comparative Examples 5 and 6 with the total basis weights of 116 g/$m^2$ and 77 g/$m^2$ respectively were prepared by paper-making and coating in the same paper-making condition as in Example 1, except that the basis weights were adjusted to 107 g/$m^2$ and 68 g/$m^2$ respectively by using the same paper material as in Example 1.

In the transfer paper of Comparative Example 5, stiffness was too large, the problem of runnability and partial deletion occurred frequently, so that the transfer paper was not suitable for practical use.

Contrariwise, in the transfer paper of Comparative Example 6, stiffness was too small, the condition $L_{MD}/H_{MD} \geqq 60$ was not satisfied and partial deletion occurred frequently, so that the transfer paper was not suitable for practical use.

Comparative Examples 7 and 8

Paper-making was performed by using the same paper material as in Example 1 and in the same condition as in Example 1, and transfer paper of Comparative Example 7 was prepared in the same manner as in Example 1, except that the amount of NaCl in the size-press process was changed from 0.1 g/$m^2$ to 0.03 g/$m^2$. Transfer paper of Comparative Example 8 was prepared in the same manner as in Example 1, except that the amount of NaCl was changed to 0.20 g/$m^2$.

In the transfer paper of Comparative Example 7, density irregularity and toner scatter were poor, so that the transfer paper was not suitable for practical use.

In the transfer paper of Comparative Example 8, density irregularity was poor, so that the transfer paper was not suitable for practical use.

Comparative Examples 9 and 10

Paper-making was performed by using the same paper material as in Example 1 and in the same condition as in Example 1, and a machine calender was adjusted to obtain two kinds of base paper with the density of 8.78 g/$cm^3$ and the density of 0.92 g/$cm^3$ respectively. The two kinds of base paper were subjected to duplex coating in the rate of 4 g/$m^2$ per single side to thereby prepare two kinds of transfer paper of Comparative Examples 9 and 10.

In the transfer paper of Comparative Example 9 , density irregularity was poor, so that the transfer paper was not suitable for practical use.

Further, in the transfer paper of Comparative Example 10, stiffness was too small, the condition $L_{MD}/H_{MD} \geqq 60$ was not satisfied and partial deletion occurred frequently, so that the transfer paper was not suitable for practical use.

Comparative Examples 11 and 12

Paper-making was performed by using the same paper material as in Example 1 and in the same condition as in Example 1, and then duplex coating was applied in the amount of coating of 1 g/m$^2$ per single side to thereby prepare transfer paper of Comparative Example 11 with the total basis weight of 89 g/m$^2$, and duplex coating was applied in the amount of coating of 14 g/m$^2$ per single side to thereby prepare transfer paper of Comparative Example 12 with the total basis weight of 115 g/m$^2$.

In the transfer paper of Comparative Example 11, density irregularity was poor, so that the transfer paper was not suitable for practical use.

Further, in the transfer paper of Comparative Example 12, the feeling of plain paper was missing.

TABLE 2

| Comparative Example | 1 | 2 | 3 | 4 | 5 | 6 | 7 | 8 | 9 | 10 | 11 | 12 |
|---|---|---|---|---|---|---|---|---|---|---|---|---|
| BASIS WEIGHT (g/m$^2$) | 86 | 86 | 86 | 86 | 107 | 68 | 86 | 86 | 86 | 85 | 86 | 86 |
| DENSITY (g/m$^3$) | 0.84 | 0.84 | 0.84 | 0.84 | 0.86 | 0.84 | 0.84 | 0.84 | 0.78 | 0.92 | 0.84 | 0.94 |
| DRY PULP MIXTURE RATIO (WEIGHT %) | 50 | 50 | 20 | 50 | 50 | 50 | 50 | 50 | 50 | 50 | 50 | 50 |
| TOTAL BASIS WEIGHT (g/m$^2$) | 95 | 95 | 95 | 95 | 116 | 77 | 95 | 95 | 95 | 95 | 89 | 115 |
| COATING AMOUNT ON FS/WS FACE (g/m$^2$) | 4/4 | 4/4 | 4/4 | 4/4 | 4/4 | 4/4 | 4/4 | 4/4 | 4/4 | 4/4 | 1/1 | 14/14 |
| OPACITY (%) | 93.7 | 93.5 | 92.0 | 89.2 | 94.3 | 88.0 | 93.6 | 93.6 | 94.2 | 92.2 | 92.8 | 95.0 |
| MD STIFFNESS (cm) | 20.0 | 21.4 | 20.9 | 21.8 | 23.4 | 18.7 | 20.8 | 20.9 | 21.6 | 18.5 | 20.0 | 22.6 |
| CD STIFFNESS (cm) | 19.7 | 18.5 | 19.4 | 19.8 | 20.9 | 17.0 | 19.0 | 19.0 | 19.4 | 15.5 | 18.6 | 20.2 |
| MD EXPANSIVITY (%) | 0.32 | 0.29 | 0.35 | 0.30 | 0.32 | 0.32 | 0.30 | 0.30 | 0.32 | 0.32 | 0.30 | 0.30 |
| CD EXPANSIVITY (%) | 0.41 | 0.44 | 0.54 | 0.42 | 0.44 | 0.43 | 0.43 | 0.43 | 0.43 | 0.45 | 0.43 | 0.42 |
| MD (STIF./EXT.) | 62.5 | 73.8 | 59.7 | 72.7 | 73.1 | 58.4 | 69.3 | 69.7 | 67.5 | 57.8 | 66.7 | 75.37 |
| CD (STIF./EXT.) | 48.0 | 42.0 | 35.9 | 47.1 | 47.5 | 39.5 | 44.2 | 44.Z | 45.1 | 34.4 | 43.3 | 48.1 |
| FIBER ORIENTATION RATIO | 1.08 | 1.28 | 1.16 | 1.16 | 1.16 | 1.16 | 1.16 | 1.16 | 1.16 | 1.16 | 1.16 | 1.16 |
| SURFACE RESIST. (Ω) | $4.0 \times 10^9$ | $4.0 \times 10^9$ | $4.0 \times 10^9$ | $4.0 \times 10^9$ | $4.0 \times 10^9$ | $4.0 \times 10^9$ | $3.4 \times 10^{11}$ | $7.6 \times 10^9$ | $4.0 \times 10^9$ | $4.0 \times 10^9$ | $4.0 \times 10^9$ | $4.0 \times 10^9$ |
| PARTIAL DELETION (TIMES/25 SHEETS) | 8<br>0 | 10<br>0 | 11 | 0 | Z4 | 13 | 0 | 0 | 0 | 24 | 0 | 0 |
| SHOW THROUGH | A | A | B | C | A | C | A | A | A | B | A | A |
| DENSITY IRREGULARITY | A | A | A | A | A | A | C | C | C | A | C | A |
| TONER SCATTERING | A | A | A | A | A | A | C | A | B | A | B | A |
| FEELING OF ORIDINARY | A | A | A | A | C | A | A | A | A | A | A | C |

What is claimed is:

1. Electrophotographic transfer paper, wherein stiffness $L_{MD}$(cm) in MD and expansivity $H_{MD}$(%) in MD satisfy an expression of $L_{MD}/H_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

2. Electrophotographic transfer paper according to claim 1, wherein pulp used in said electrophotographic transfer paper including 30% or more by weight of dry pulp per overall pulp weight.

3. Electrophotographic transfer paper according to claim 1, wherein a fiber orientation ratio of said electrophotographic transfer paper by an ultrasonic propagation method is in a range of 1.10 to 1.25.

4. Electrophotographic transfer paper according to claim 2, wherein a fiber orientation ratio of said electrophotographic transfer paper by an ultrasonic propagation method is in a range of 1.10 to 1.25.

5. Electrophotographic transfer paper, wherein stiffness $L_{CD}$(cm) in CD and expansivity $H_{CD}$(%) in CD satisfy an expression of $L_{CD}/H_{CD} \geqq 35$, where CD represents a paper direction perpendicular to the direction of movement of said paper machine, and $L_{CD}$ represent overhanging lengths (cm) when stiffness in MD is calculated by Clark A method in accordance with JISP8143.

6. Electrophotographic transfer paper according to claim 5, wherein pulp used in said electrophotographic transfer paper contains 30% or more by weight of dry pulp per overall pulp weight.

7. Electrophotographic transfer paper according to claim 5, wherein a fiber orientation ratio of said electrophotographic transfer paper by an ultrasonic propagation method is in a range of from 1.10 to 1.25.

8. Electrophotographic transfer paper according to claim 6, wherein a fiber orientation ratio of said electrophotographic transfer paper by an ultrasonic propagation method is in a range of from 1.10 to 1.25.

9. Electrophotographic transfer paper according to claim 5, wherein stiffness $L_{MD}$(cm) in MD and expansivity $H_{MD}$ (%) in MD satisfy an expression of $L_{MD}/L_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

10. Electrophotographic transfer paper according to claim 6, wherein stiffness $L_{MD}$(cm) in MD and expansivity $H_{MD}$ (%) in MD satisfy an expression of $L_{MD}/H_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

11. Electrophotographic transfer paper according to claim 7, wherein stiffness $L_{MD}$(cm) in MD and expansivity $H_{MD}$ (%) in MD satisfy an following of $L_{MD}/H_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

12. Electrophotographic transfer paper according to claim 8, wherein stiffness $L_{MD}$(cm) in MD and expansivity $H_{MD}$ (%) in MD satisfy an expression of $L_{MD}/H_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

13. Electrophotographic transfer-paper comprising:

base paper having a density in a range of 0.80 to 0.90 g/cm$^3$; and a coating layer provided on at least one side of said base paper, said coating layer having a solid content in a range of 2 to 12 g/cm$^2$;

wherein a basis weight is in a range of 80 to 110 g/m$^2$, an opacity is not lower than 90%, and stiffness $L_{MD}$(cm) in MD and expansivity $H_{MD}$(%) in MD satisfy an expression of $L_{MD}/H_{MD} \geqq 60$, where MD represents a paper direction parallel to the direction of movement of a paper machine, and $L_{MD}$ represents overhanging lengths (cm) when stiffness in MD is calculated by Clark A method in accordance with JISP8143.

14. Electrophotographic transfer paper according to claim 13, wherein stiffness $L_{CD}$(cm) in CD and expansivity $H_{CD}$ (%)in CD satisfy an expression of $L_{CD}/H_{CD} \geqq 35$, where CD represents a paper direction perpendicular to the direction of movement of said paper machine, and $L_{CD}$ represent overhanging lengths (cm) when stiffness in MD is calculated by Clark A method in accordance with JISP8143.

15. Electrophotographic transfer paper according to claim 13, wherein pulp used in said electrophotographic transfer paper contains 30% or more by weight of dry pulp per overall pulp weight.

16. Electrophotographic transfer paper according to claim 14, wherein pulp used in said electrophotographic transfer paper contains 30% or more by weight of dry pulp per overall pulp weight.

17. Electrophotographic transfer paper according to claim 14, wherein a fiber orientation ratio by an ultrasonic propagation method is in a range of 1.10 to 1.25.

18. Electrophotographic transfer paper according to claim 16, wherein a fiber orientation ratio by an ultrasonic propagation method is in a range of 1.10 to 1.25.

19. Electrophotographic transfer paper according to claim 14, wherein a surface resistivity of said transfer paper in accordance with JISK6911 at 20° C. and 65%RH is in a range of $1\times10^9$ to $1\times10^{11}\Omega$.

20. Electrophotographic transfer paper according to claim 16, wherein a surface resistivity of said transfer paper in accordance with JISK6911 at 20° C. and 65%RH is in a range of $1\times10^9$ to $1\times10^{11}\Omega$.

* * * * *

UNITED STATES PATENT AND TRADEMARK OFFICE

CERTIFICATE OF CORRECTION

PATENT NO. : 5,637,383

DATED : June 10, 1997

INVENTOR(S) : SAKURAI ET AL.

It is certified that error appears in the above-indentified patent and that said Letters Patent is hereby corrected as shown below:

Title page:

[73] Fuji Xerox Co., Ltd., Tokyo, Japan
New Oji Paper Co., Ltd., Tokyo, Japan

Signed and Sealed this

Eighteenth Day of November 1997

Attest:

Bruce Lehman

BRUCE LEHMAN

*Attesting Officer* *Commissioner of Patents and Trademarks*